DRIVER CIRCUIT

Filed July 25, 1967

INVENTOR.
JOHN GUZAK, JR.
BY Joseph J. Grass
ATTORNEY

United States Patent Office 3,506,854
Patented Apr. 14, 1970

3,506,854

DRIVER CIRCUIT

John Guzak, Jr., Waukegan, Ill., assignor to SCM Corporation, New York, N.Y., a corporation of New York Filed July 25, 1967, Ser. No. 655,910
Int. Cl. H03k 1/12, 5/01
U.S. Cl. 307—262 2 Claims

ABSTRACT OF THE DISCLOSURE

There is disclosed circuitry with electrical output at one level relative to a reference potential during reception of an input signal and at a matched level electrical output in the opposing sense when there is no input signal. When a first transistor is turned on during reception of an input signal, a first current path through the first transistor is established. When there is no signal to drive the first transistor to its on condition, a second transistor electrically connected to the first transistor is driven to its on condition and a second current path through the second transistor is established. A diode is connected in series with the collector of the first transistor and the circuit output line and in parallel with the base-emitter path of the second transistor and assures that there is no current flow through the second transistor in the second current path when the first transistor is on. The first and second current paths enable a polarized output signal. A resistor-capacitor wave-shaping network is located in the output circuit.

This invention relates to a current driver circuit which is particularly useful in communication equipment, for example, in connection with a sender such as a keyboard transmitter or a record reader, or a receiver or the like, Electrical drive alternately in one direction and in the opposite direction is frequently desirable in communication equipment. When the current drive in one direction is equal in magnitude to current drive in the opposite direction, the drive is considered to be "matched" or polarized and is advantageous because it minimizes the tendency for external influences such as electrical noise to influence the receiver.

Accordingly, a primary object of the present invention resides in providing novel circuitry which produces a polarized output signal.

Another object of the invention is to provide improved driver circuitry alternately providing matched electrical drive in one direction and in the opposite direction, which is economical to manufacture, is reliable in operation, and has relatively few components.

Another object of the present invention resides in the provision of a novel solid-state current driver circuitry having an output alternatively subject to two equal levels of potential having opposed polarity relative to a reference potential, the circuitry having two transistors one of which is turned "on" and "off" by the signal condition on input line to its base and the other of which is turned "off" and "on" respectively by the opposite conditions of the first transistor, the "on" condition of the first transistor providing a circuit path at a potential level of one polarity through a diode to the output and the "on" condition of the second transistor providing a similar potential level of the other polarity to the output.

Figure 1:
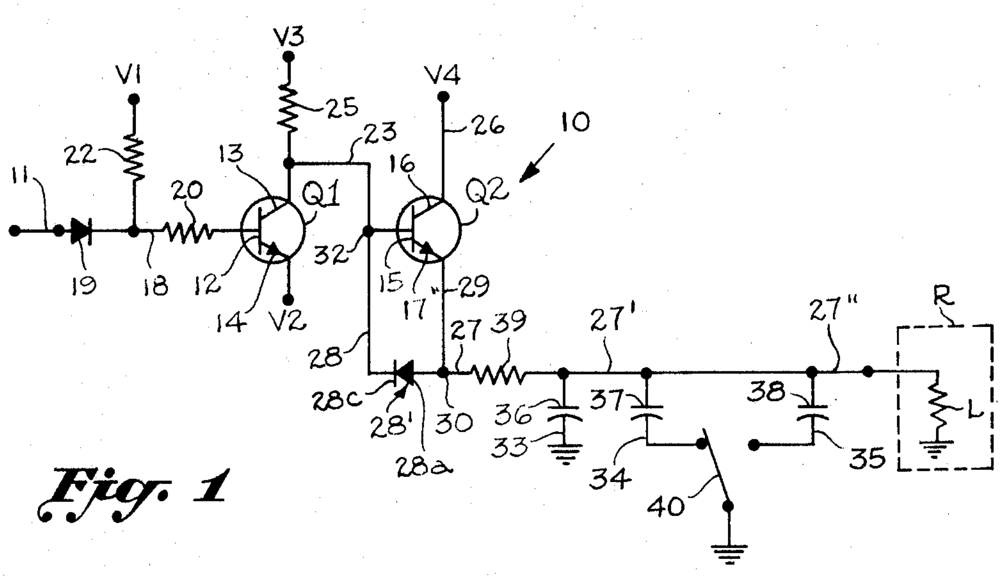
Figure 2:
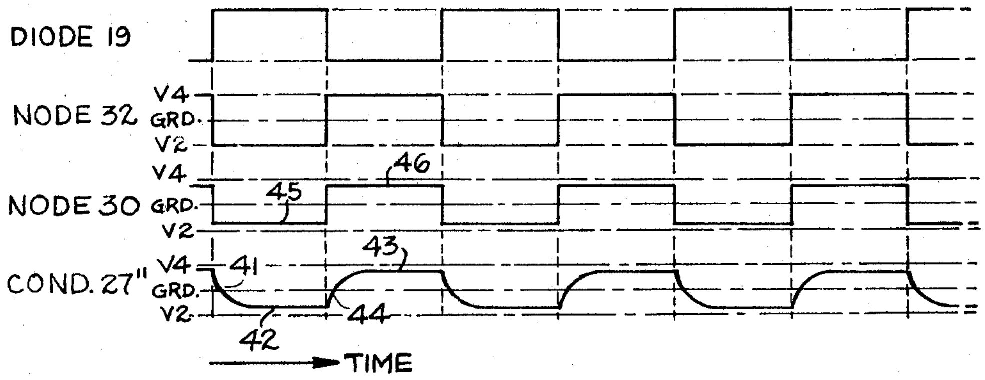

Other objects and novel features will become apparent from the following detailed description and the accompanying drawings, in which:

FIGURE 1 is a circuit diagram of driver circuitry in accordance with the invention; and FIGURE 2 is a view showing waveforms at various locations in the circuitry shown in FIGURE 1.

Referring now to FIGURE 1 of the drawing, there is shown driver circuitry generally indicated at 10 which, in the illustrated embodiment, is part of a keyboard transmitter and forms its output circuitry. The circuitry 10 can form the output circuitry for other senders such as a record reader or in other electrical devices. Electrical input signals generated, for example, in a keyboard transmitter (not shown) are sequentially impressed on a signal input line 11.

The circuitry 10 is depicted in FIGURE 1 connected to receiver R having a resistive load L connected to ground. The coupling of the circuitry 10 to the receiver can be by wire (as shown), by radio, or the like. The receiver R can, for example, be a teleprinter, a reperforator, or the like. The circuitry 10 is shown to include solid-state devices in the form of transistors Q1 and Q2 of the NPN type. The transistor Q1 is connected in a common-emitter configuration and the transistor Q2 is connected in a common-collector configuration. The transistor Q1 has a base 12, a collector 13 and an emitter 14. The transistor Q2 has a base 15, a collector 16, and an emitter 17. A conductor 18 containing a diode 19 and a resistor 20 is connected to the input line 11 and to the base 12 of the transistor Q1. A resistor 22 is connected to a source of bias voltage V1 and to the conductor 18 between the diode 19 and the resistor 20; thus, the transistor Q1 is normally biased to the off condition, that is, to the non-conducting condition, but an input signal in input line 11 will drive the base 12 of the transistor Q1 more positive than the voltage of the regulated negative voltage source V2, thereby turning the transistor Q1 on, that is, rendering the transistor Q1 conducting. If desired, the input line 11 can be connected directly to the base 12, provided the input current is suitably limited. The voltage level V2 is regulated to be equal in magnitude and opposite in polarity to the voltage level V4.

The collector 13 of the transistor Q1 and the base 15 of the transistor Q2 are directly connected to each other by a conductor 23. A resistor 25 is connected to a source of positive voltage V3 and to the conductor 23. A conductor 26 is connected to a source of positive constant voltage V4 and to the collector 16 of the transistor Q2. A conductor 27 connected to conductors 28 and 29 at a node 30 is shown to be connected to ground through a resistor 39, conductors 27′ and 27″, and the load L. The conductor 28 is also connected to the conductor 23 at a node 32 situated between the connection of the resistor 25 to the conductor 23 and the base 15 of the transistor Q2. The conductor 28 contains a solid-state device in the form of a diode 28′ and is connected in series with the transistor Q1 and in parallel with the base-emitter path of transistor Q2. The diode 28′ has an anode **28*a* and a cathode 28*c*. The anode 28*a* is connected to the emitter 17 and the cathode 28*c* is connected to the base 15 and to the collector 13**.

Conductors 33, 34, and 35 connect respective capacitors 36, 37, and 38 to ground and to the conductor 27′ which is connected to the resistor 39. The resistor 39 and capacitors 36, 37, and 38 are connected to provide a wave-shaping network. Either one of the conductors 34 and 35 can be connected to ground through a switch 40. In the illustrated embodiment, the capacitor 38 has greater capacitance than the capacitor 37. When the baud rate, that is, the frequency of the output signal is high, the switch 40 is connected to the conductor 34 and when the baud rate is low, the switch 40 is connected to the conductor 35, thereby enabling the rise and fall times of the output signal voltage indicated at waveform "Cond. 27″" in FIGURE 2 to be manually set to satisfactory values. The waveform indicated at "Node 32" illustrates the waveform at the node 32 and the waveform indicated at "Node 30" illustrates the waveform at the node 30.

The voltage level at the source V1 assures that the transistor Q1 is normally biased to the off condition. A signal applied by the signal line 11 through the diode 19, represented by the waveform indicated as "Diode 19" in FIGURE 2, will forward bias the transistor Q1 through its base-emitter path to the negtaive voltage source V2, and turns the transistor Q1 on. The transistor Q1 remains on until termination of the input signal and, in particular, until the base 12 of the transistor Q1 becomes more negative than the voltage source V2 to which the emitter 14 is directly connected. When the transistor Q1 is on, a circuit is completed and provides a current path from ground, through the load L, the conductors 27″ and 27′, the resistor 39, the conductors 27, 28, and 23, and the collector-emitter path of the transistor Q1 to the negative voltage source V2; the node 30 being at a more positive voltage than the node 32, the base 15 of the transistor Q2 is reverse biased to drive the transistor Q2 to the off condition as long as this current path is complete. As the capacitor 36 and the selected capacitor 37 or 38 are charging, the output voltage at the conductor 27″ falls as indicated by curved line 41 in FIGURE 2. When the capacitors 36 and 37 or 38 have been charged, the voltage level of the signal remains substantially constant as indicated by straight line 42 in FIGURE 2. When the input signal on line 11 causes the voltage at base 12 of the transistor Q1 to become more negative than the voltage V2, the signal at conductor 27″ will return to a level indicated at 43, but because of the capacitor 36 and one of the selected capacitors 37 and 38 the rise in the output signal voltage will generally follow a curved line 44 until the level 43 is reached. If the larger capacitor 38 is in the network circuit instead of the smaller capacitor 37, as determined by the position of the switch 40, the time it takes the voltage of the output signal to fall to the level indicated by the line 42 will be longer, as will be the time it takes the voltage of the output signal to rise from the level indicated by the line 42 to the level indicated by the line 43. The switch 40 enables the charging time rate of the resistor-capacitor network to be varied. The diode 28′ is poled to assure that the transistor Q2 will be biased to its off condition when the current path through the transistor Q1 is completed.

When the transistor Q1 turns off, that is, when the voltage at its base 12 becomes less negative than the voltage V2, the current path through the transistor Q1 is broken. A current path is immediately established from the positive voltage source V3, through tht resistor 25, the conductor 23, the base-emitter path of the transistor Q2, the conductors 29, 27, 27′, and 27″, and the load L to ground, thereby turning the transistor Q2 on and establishing a current path from the positive voltage source V4, through the collector-emitter path of the transistor Q2, the conductors 29, 27′, and 27″, and the load L to ground. As the capacitor 36 and either one of the selected capacitors 37 or 38 charge, the voltage at the output conductor rises as indicated by line 44 (FIGURE 2) until the level indicated by line 43 is reached. When a subsequent input signal (as shown in FIGURE 2) is impressed on the line 11, the transistor Q1 is again turned on, the circuit or current path through the transistor Q1 is again completed, the transistor Q2 is again automatically turned off, and the circuit or current path through the transistor Q2 is again broken.

By way of example, not limitation, the negative D.C. voltage V1 is more negative than the negative D.C. voltage V2, and the positive D.C. voltage V3 is more positive than the positive D.C. voltage V4; the voltage V2 is equal in magnitude and opposite in polarity to the voltage V4; the magnitude of the voltage levels indicated by line 45 is equal in magnitude and opposite in polarity to the voltage level indicated by line 46, and the magnitude of the voltage level indicated by line 42 is equal in magnitude and opposite in polarity to the voltage level indicated by line 43. For example, when the voltage V4 is set to plus 6.8 volts, the voltage V2 is set to minus 6.8 volts, the voltage V1 can be minus 12 volts and the voltage V3 can be plus 12 volts.

The invention may be embodied in other specific forms without departing from the spirit or essential characteristics thereof. The present embodiment is therefore to be considered in all respects as illustrative and not restrictive, the scope of the invention being best defined by the appended claims rather than by the foregoing description, and all changes which come within the meaning and range of equivalency of the claims are therefore intended to be embraced therein.

What is claimed is:

1. Driver circuit for use in communication equipment, comprising: a first transistor having an emitter, a base and a collector, an electrical energy source including means providing first, second, third and fourth voltage levels and a reference voltage level, means connecting the emitter-collector path of said first transistor between said first voltage level and said third voltage level, signal input means connected to the base of said first transistor and including a connection to said fourth voltage level and operative in response to signal reception to turn said first transistor on, signal output means connected to said reference voltage level, a second transistor having an emitter, a base and a collector, means connecting the collector-emitter path of said second transistor between said second voltage level and said output means, means connecting the collector of said first transistor and the base of said second transistor, means electrically connected in parallel to the base-emitter path of said second transistor including a diode poled to prevent current flow through said second transistor when said first transistor is on; said second and third voltage levels having opposite values relative to said reference voltage level, said first voltage level being higher than said second voltage level and being of the same polarity relative to said reference voltage level; said fourth voltage level being higher than said third voltage level and of the same polarity relative to said reference voltage level whereby in response to an input signal on the input means, when the first transistor is on, a current path is provided between said third voltage level and said reference voltage level through said first transistor to said output means to provide electrical output at one electrical voltage level relative to said reference voltage level and when the first transistor is off a current path is provided between said second voltage level and said reference voltage level through said second transistor to provide electrical output at an opposite but matched electrical voltage level relative to said reference voltage level, a wave-shaping network forming part of said output means, said wave-shaping network including a resistor-capacitor network having at least two capacitors through which said output means is connectable to said reference voltage level, said first and second capacitors being connected in parallel with respect to each other, and a switch in series with at least one of said capacitors, operation of said switch being effective to selectively alter the charging rate of said resistor-capacitor network.

2. Driver circuit as defined in claim 1, wherein said resistor-capacitor network includes a third capacitor in parallel with said first and second capacitors, said switch being movable between a position in which said second capacitor is effectively in said circuit and said third capacitor is effectively out of said circuit and another position in which said third capacitor is effectively in said circuit and said second capacitor is effectively out of said circuit, said first and second voltage levels being positive relative to said reference voltage level, said third and fourth voltage levels being negative relative to said reference voltage level, and said first and second transistors being of the NPN type.

References Cited

UNITED STATES PATENTS

| | | | |
|---|---|---|---|
| 2,965,855 | 12/1960 | Ketchledge | 307—294 XR |
| 3,114,054 | 12/1963 | Gilson et al. | 307—218 |
| 3,381,144 | 4/1968 | Thomas | 307—214 XR |

JOHN S. HEYMAN, Primary Examiner

J. ZAZWORSKY, Assistant Examiner

U.S. Cl. X.R.

307—254, 268, 270